US005555645A

United States Patent [19]

Joslin

[11] Patent Number: 5,555,645
[45] Date of Patent: Sep. 17, 1996

[54] REVERSING CLOTHES DRYER AND METHOD THEREFOR

[75] Inventor: Dan F. Joslin, Fort Dodge, Iowa

[73] Assignee: White Consolidated Industries, Inc., Cleveland, Ohio

[21] Appl. No.: 115,395

[22] Filed: Aug. 31, 1993

Related U.S. Application Data

[63] Continuation of Ser. No. 40,766, Mar. 31, 1993, abandoned.

[51] Int. Cl.$^6$ ............................. F26B 3/00; F26B 19/00
[52] U.S. Cl. ............................ 34/499; 34/572; 34/513; 34/427; 34/86
[58] Field of Search .......................... 34/527, 563, 560, 34/572, 513, 427, 86, 497, 498, 499

[56] References Cited

U.S. PATENT DOCUMENTS

| | | |
|---|---|---|
| 2,573,571 | 10/1951 | Howland . |
| 2,643,463 | 6/1953 | Grantham . |
| 2,861,355 | 11/1958 | Douglas . |
| 2,961,776 | 11/1960 | Hughes . |
| 3,066,422 | 12/1962 | Douglad . |
| 3,210,862 | 10/1965 | Lycan . |
| 3,254,423 | 6/1966 | Ruelle . |
| 3,309,783 | 3/1967 | Worst . |
| 3,331,141 | 7/1967 | Jacobs et al. . |
| 3,364,588 | 1/1968 | Ziegler . |
| 3,409,994 | 11/1968 | Menk . |
| 3,509,640 | 5/1970 | Bullock et al. . |
| 3,514,867 | 6/1970 | Patrick . |
| 3,546,786 | 12/1970 | Jacobs . |
| 3,696,521 | 10/1972 | Hubbard . |
| 3,815,258 | 6/1974 | Beard, Jr. . |
| 3,882,613 | 5/1975 | Wilson . |
| 3,942,265 | 3/1976 | Sisler et al. . |
| 4,206,552 | 6/1980 | Pomerantz et al. . |
| 4,231,166 | 11/1980 | McMillan . |
| 4,267,643 | 5/1981 | Haried . |
| 4,407,078 | 10/1983 | Takeyama et al. . |
| 4,412,389 | 11/1983 | Kruger . |
| 4,510,697 | 4/1985 | Beasley et al. . |
| 4,586,267 | 5/1986 | Sussman ............................. 34/53 X |
| 4,622,759 | 11/1986 | Abe et al. . |
| 4,663,861 | 5/1987 | Schriber . |
| 4,713,894 | 12/1987 | Roth et al. . |
| 4,738,034 | 4/1988 | Muramatsu et al. . |
| 4,827,627 | 5/1989 | Cardoso . |

*Primary Examiner*—Henry A. Bennett
*Assistant Examiner*—Steve Gravini
*Attorney, Agent, or Firm*—Pearne, Gordon, McCoy & Granger

[57] ABSTRACT

A domestic clothes dryer is operated in both a forward and a reverse direction. The dryer blower has a reduced air flow rate in the reverse direction. The reduced air flow in the reverse direction and the reverse tumbling increases the heat transferred to the articles being dried, thereby improving dryer performance.

14 Claims, 2 Drawing Sheets

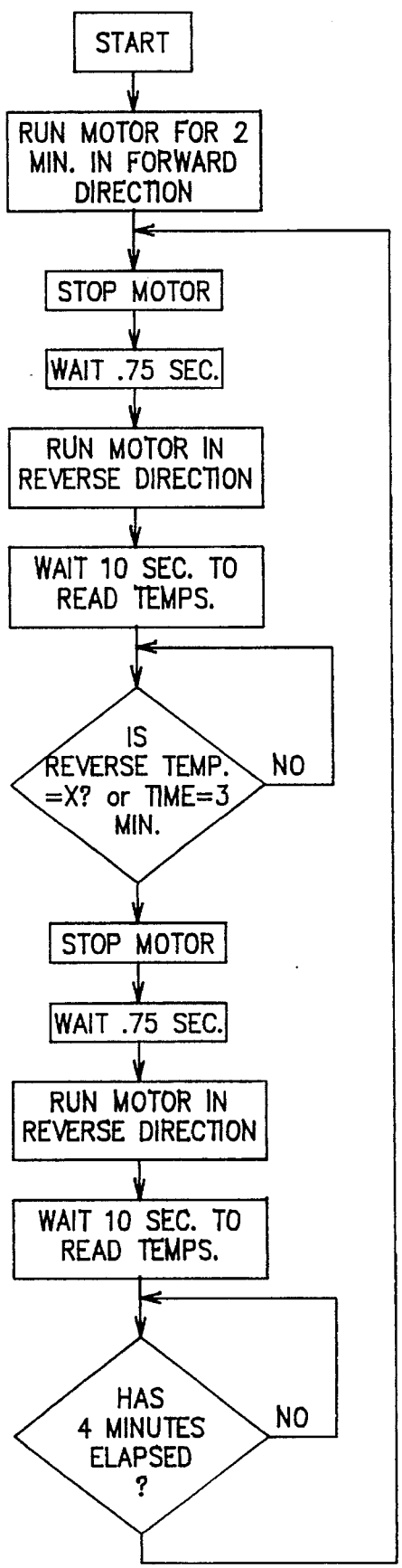

REVERSING CLOTHES DRYER AND METHOD THEREFOR

This is a continuation of application Ser. No. 08/040,766, filed Mar. 31, 1993 now abandoned.

BACKGROUND OF THE INVENTION

This invention relates to clothes dryers and, in particular, to domestic clothes dryers that tumble the clothes in both a clockwise and counterclockwise direction.

It has become increasingly important to minimize the amount of energy used by household appliances.

Efficiencies in electrical components, insulation and other components have been sought and the search continues for other means to minimize the energy use of appliances. This is particularly the case for clothes dryers because of the substantial amounts of energy necessary to remove the water from the articles being dried.

SUMMARY OF THE INVENTION

The present invention is able to reduce the drying time of articles in a domestic clothes dryer by 10 percent. This results in a corresponding reduction of energy consumption.

In addition, clothes are less likely to become tangled and wrinkled during the drying process.

The dryer includes a rotatable drum for containing the article to be dried, a heater for heating air, a blower for moving heated air from the heater to the drum, and an electric motor for driving the drum and blower.

The blower and drum may be driven in a forward direction or a reverse direction. The blower provides a first airflow rate in the forward direction and a second airflow rate in the reverse direction. The first rate is greater than the second rate.

The dryer also includes a controller for controlling the motor such that the drum and blower are alternately driven in the forward direction and in the reverse direction.

The controller can operate by controlling the motor such that the drum and blower are driven in the forward direction until a desired forward time is exceeded and driven in the reverse direction until a desired reverse time or a desired reverse temperature is exceeded.

BRIEF DESCRIPTION OF THE DRAWINGS

FIG. 3 is a flow chart of another control for a dryer according to the invention.

DESCRIPTION OF THE PREFERRED EMBODIMENTS

Figure 1:
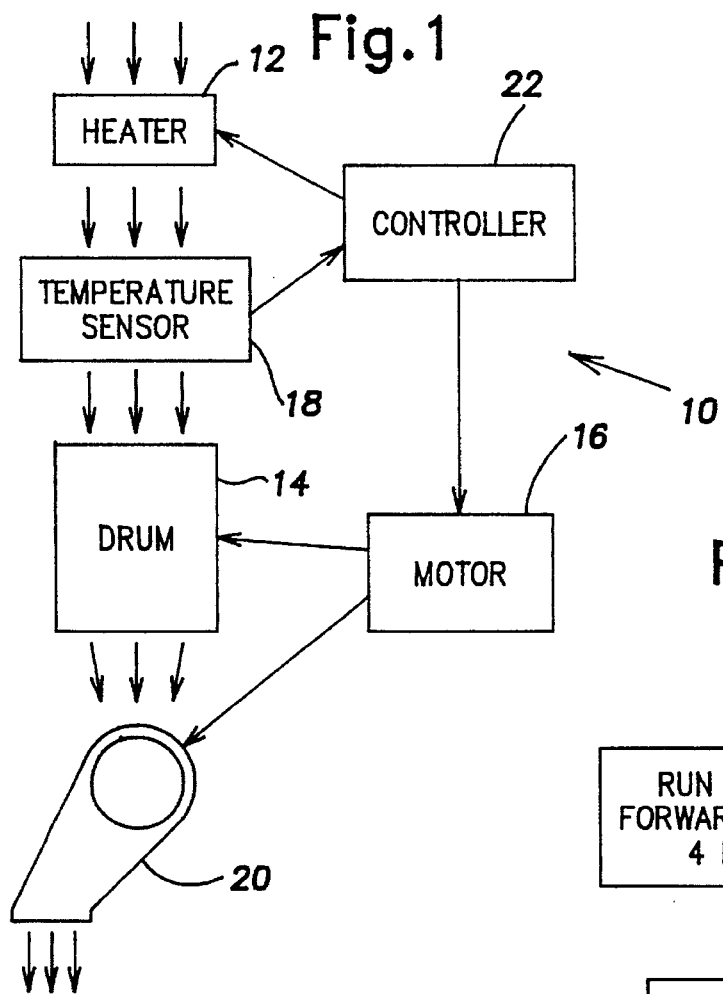
FIG. 1 is a block diagram of a dryer according to the invention.

Referring to FIG. 1, a domestic clothes dryer 10 has a heater 12. The heater 12 may be, for example, an electric or gas heater.

The heater 12 communicates with a rotatable drum 14 for containing an article or articles to be dried. An electric motor 16 provides motive power to the drum 14. The motor 16 may be, for example, coupled to the drum 14 by unshown pulleys and a belt.

A temperature sensor 18 senses the temperature of air entering the drum 14.

A blower 20 communicates with the drum 14. The blower 20 is configured to draw air through the heater 12, by the sensor 18 and into the drum 14 before exhausting the air from the dryer 10.

The motor 16 also provides motive power to the blower 20. The motor 16 may be, for example, also coupled to the blower 20 by unshown pulleys and a belt.

A controller 22 controls the operation of the motor 16, including the direction of rotation. The controller 22 also controls the operation of the heater 12. The controller 22 is responsive to the temperatures sensed by the sensor 18.

The blower 20 provides a two different air flow rates depending on the direction it is rotated. The blower 20 may be, for example, a centrifugal blower, in particular, a squirrel-cage blower.

A squirrel-cage blower is typically designed to have a maximum air flow rate corresponding to revolution in a particular direction (e.g., clockwise), the "forward" direction. When the blower is operated in the opposite direction (e.g., counterclockwise), the "reverse direction," the blower still moves air in the same direction, but at a reduced rate. This reduced rate may be, for example, 70% or less of the maximum rate. Typically, the reduced rate is 50% of the maximum rate.

Figure 2:
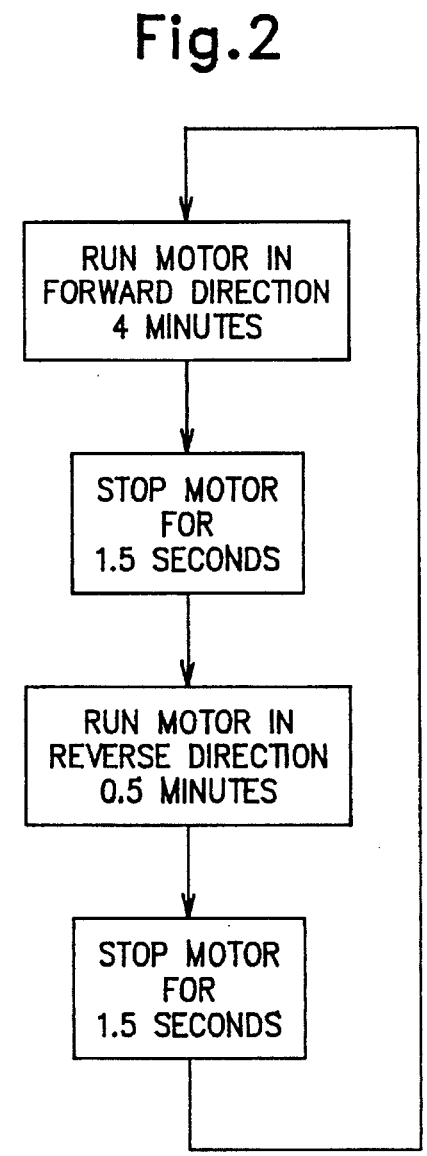
FIG. 2 is a flow chart of a control for a dryer according to the invention.

Referring to FIG. 2, a control method suitable for use in a dryer 10 having limited control capabilities (e.g., no microprocessor) is illustrated.

The motor 16 is first run in the forward direction. This rotates the drum 14 in the forward direction and the blower 20 in the forward direction (the direction of maximum air flow rate). The motor 16 is run in the forward direction for a period of time (e.g., 4 minutes).

Then the motor 16 is stopped for period of time to allow the drum 14, the blower 20 and any articles being dried to stop moving (e.g., 1.5 seconds).

The motor 16 is then run in the reverse direction. This rotates the drum 14 in the reverse direction and the blower 20 in the reverse direction (the direction of reduced air flow rate). The motor 16 is run in the reverse direction for a period of time (e.g., 0.5 minutes).

Then the motor 16 is stopped for period of time to allow the drum 14, the blower 20 and any articles being dried to stop moving (e.g., 1.5 seconds).

This alternate forward and reverse operation of the dryer 10 continues until the articles being dried reach the desired dryness.

This embodiment can be implemented with a mechanical timer coupled with an electronic motor direction control.

The operation of the heater 12 by the controller 22 in this embodiment is in accordance with well-known practices in the field of domestic clothes dryers. For example, a thermostat may cycle the heater off and on as a temperature limit is successively exceeded and dropped below, respectively.

The reduced air flow through the dryer 10 during reverse operation increases the amount of heat transferred to the articles being dried. This rate of heat transfer could be unacceptable for extended periods, but because forward operation soon resumes, the overall temperature in the drum 14 is kept within acceptable limits.

The alternating reverse rotation of the articles being dried also results in better exposure of the articles to the heated airflow. This also increases heat transfer to the articles.

The increased transfer of heat to the articles being dried results in quicker drying, with a commensurate decrease in energy usage.

In addition, tumbling the articles in both directions minimizes tangling and wrinkling.

Referring to FIG. 3, a control method suitable for use in a dryer 10 having a microprocessor embedded in the controller 22 is illustrated.

The motor 16 is initially run in the forward direction for fixed time (e.g., 2 minutes). This rotates the drum 14 in the forward direction and the blower 20 in the forward direction (the direction of maximum air flow rate).

Then the motor 16 is stopped for period of time (e.g., 0.75 seconds) to allow the drum 14, the blower 20 and any articles being dried to stop moving.

The motor 16 is then run in the reverse direction. This rotates the drum 14 in the reverse direction and the blower 20 in the reverse direction (the direction of reduced air flow rate).

After starting the dryer 10 in the reverse direction, a delay (e.g., 10 seconds) is provided before temperatures are sensed by the sensor 18. This allows temperature transients resulting from stopping the motor 16 to dissipate.

The dryer 10 is run in the reverse direction until either a desired reverse time (e.g., 3 minutes) or a desired reverse temperature x at the inlet of the drum 14 is exceeded.

The reverse temperature x may be varied by an unshown selector switch to optimize the drying process for different fabrics. For example: delicates x=90° C.; knits x=95° C.; permanent press x=100° C.; cottons x=105° C.; and heavy dense articles x=110° C.

When the desired reverse time or the desired reverse temperature x is exceeded, the motor 16 is stopped for period of time (e.g., 0.75 seconds) to allow the drum 14, the blower 20 and any articles being dried to stop moving.

The motor 16 is then run in the forward direction, rotating the drum 14 in the forward direction and the blower 20 in the forward direction.

After starting the dryer 10 in the forward direction, a delay (e.g., 10 seconds) is provided before temperatures are sensed by the sensor 18. This allows temperature transients resulting from stopping the motor 16 to dissipate.

The dryer 10 is run in the forward direction until a desired forward time is exceeded (e.g., 4 minutes).

The motor 16 is then stopped before the dryer 10 continues through additional cycles of reverse and forward operation as set forth above.

This alternate reverse and forward operation of the dryer 10 continues until the articles being dried reach the desired dryness.

During the early reverse cycles, the desired time may be exceeded before the desired reverse temperature x is exceeded, but as the articles in the drum 14 dry, the desired reverse temperature x is progressively reached more rapidly so that the reverse cycles are shorter.

The operation of the heater 12 by the controller 22 in this embodiment is in accordance with well-known practices in the field of domestic clothes dryers. For example, the sensor 18 may cause the controller 22 to cycle the heater off and on as a temperature limit is successively exceeded and dropped below, respectively.

The reduced air flow through the dryer 10 during reverse operation increases the amount of heat transferred to the articles being dried. This rate of heat transfer could be unacceptable for extended periods, but the desired reverse temperature x is chosen to limit the temperature rise in the drum 14 to a value appropriate for the articles being dried. This provides the fastest drying commensurate with the nature of the articles being dried.

The alternating reverse rotation of the articles being dried also results in better exposure of the articles to the heated airflow. This also increases heat transfer to the articles.

The increased transfer of heat to the articles being dried results in quicker drying, with a commensurate decrease in energy usage.

In addition, tumbling the articles to be dried in both directions minimizes tangling and wrinkling.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed:

1. A method for reducing the energy required to dry an article, comprising:

providing a rotatable drum for containing said article;

providing a heater for heating air;

providing a blower for moving heated air from said heater to said drum;

providing an electric motor for driving said drum and blower in a forward direction or a reverse direction, said blower providing a first airflow rate in the forward direction and a second airflow rate in the reverse direction, said first rate being greater than said second rate;

periodically increasing an amount of heat transferred to the article by driving said drum and blower in the reverse direction and alternately decreasing the amount of heat transferred to the article by driving said drum and blower in the forward direction and said heater cycling on and off during both said forward direction and said reverse direction.

2. A method according to claim 1, wherein said second airflow rate is less than seventy percent of said first airflow rate.

3. A method according to claim 1, wherein said blower is a squirrel-cage blower.

4. A method for reducing the energy required to dry an article, comprising:

providing a rotatable drum for containing said article;

providing a heater for heating air;

providing a blower for moving heated air from said heater to said drum;

providing an electric motor for driving said drum and blower in a forward direction or a reverse direction, said blower providing a first airflow rate in the forward direction and a second airflow rate in the reverse direction, said first rate being greater than said second rate; and periodically varying an amount of heat transferred to the article by driving said drum and blower in the forward direction until a desired forward time is exceeded to decrease the amount of heat transferred and alternately driving said drum and blower in the reverse direction until a desired reverse time or a desired reverse temperature is exceeded to increase the amount of heat transferred and said heater cycling on and off during both said forward direction and said reverse direction.

5. A method according to claim 4, wherein said second airflow rate is less than seventy percent of said first airflow rate.

6. A method according to claim 4, wherein said blower is a squirrel-cage blower.

7. A method for reducing the energy required to dry an article, comprising:
   a. providing a rotatable drum for containing said article;
   b. providing a heater for heating air;
   c. providing a blower for moving heated air from said heater to said drum;
   d. providing an electric motor for driving said drum and blower in a forward direction or a reverse direction;
   e. driving said drum and blower in the forward direction until a first desired forward time is exceeded;
   f. driving said drum and blower in the reverse direction with said heater cycling on and off until a desired reverse time or a desired reverse temperature is exceeded, thereby increasing an amount of heat transferred to the article;
   g. driving said drum and blower in the forward direction with said heater cycling on and off for a second desired forward time, thereby decreasing an amount of heat transferred to the article; and
   h. successively repeating steps f and g until said article reaches a desired dryness.

8. A clothes dryer for reducing the energy required to dry an article, comprising:
   a rotatable drum for containing said article;
   a heater for heating air;
   a blower for moving heated air from said heater to said drum;
   an electric motor for driving said drum and blower in a forward direction or a reverse direction, said blower providing a first airflow rate in the forward direction and a second airflow rate in the reverse direction, said first rate being greater than said second rate;
   a controller for controlling said motor such that an amount of heat transferred to the article is periodically varied by said drum and blower being alternately driven in the forward direction to decrease the amount of heat transferred and alternately in the reverse direction to increase the amount of heat transferred and said heater cycling on and off during both said forward direction and said reverse direction.

9. A dryer according to claim 8, wherein said second airflow rate is less than seventy percent of said first airflow rate.

10. A dryer according to claim 8, wherein said blower is a squirrel-cage blower.

11. A clothes dryer for reducing the energy required to dry an article, comprising:
    a rotatable drum for containing said article;
    a heater for heating air;
    a blower for moving heated air from said heater to said drum;
    an electric motor for driving said drum and blower in a forward direction or a reverse direction, said blower providing a first airflow rate in the forward direction and a second airflow rate in the reverse direction, said first rate being greater than said second rate;
    a controller for periodically varying an amount of heat transferred to the article by controlling said motor such that said drum and blower are repeatedly driven in the forward direction until a desired forward time is exceeded to decrease the amount of heat transferred and alternately driven in the reverse direction until a desired reverse time or a desired reverse temperature is exceeded to increase the amount of heat transferred and said heater cycling on and off during both said forward direction and said reverse direction.

12. A dryer according to claim 11, wherein said second airflow rate is less than seventy percent of said first airflow rate.

13. A dryer according to claim 11, wherein said blower is a squirrel-cage blower.

14. A clothes dryer for reducing the energy required to dry an article, comprising:
    a rotatable drum for containing said article;
    a heater for heating air;
    a blower for moving heated air from said heater to said drum;
    an electric motor for driving said drum and blower in a forward direction or a reverse direction; and
    a controller for controlling said motor to vary an amount of heat transferred to the article, said controller causing said motor to:
    a. drive said drum and blower in the forward direction until a first desired forward time is exceeded;
    b. drive said drum and blower in the reverse direction with said heater cycling on and off until a desired reverse time or a desired reverse temperature is exceeded, thereby increasing the amount of heat transferred;
    c. drive said drum and blower in the forward direction with said heater cycling on and off for a second desired forward time, thereby decreasing the amount of heat transferred; and
    d. successively repeat steps b and c until said article reaches a desired dryness.

* * * * *